(12) United States Patent
Monro

(10) Patent No.: US 7,844,084 B2
(45) Date of Patent: Nov. 30, 2010

(54) ROTATION COMPENSATED IRIS COMPARISON

(76) Inventor: Donald Martin Monro, 6 The Lays, Goose Street, Beckington, Somerset (GB) BA11 6RS ( * ) Notice: Subject to any disclaimer, the term of this patent is extended or adjusted under 35 U.S.C. 154(b) by 1035 days.

(21) Appl. No.: 11/363,500

(22) Filed: Feb. 27, 2006

(65) Prior Publication Data
US 2007/0201728 A1 Aug. 30, 2007

(51) Int. Cl.
G06K 9/00 (2006.01)
G06K 9/64 (2006.01)

(52) U.S. Cl. .................. 382/117; 382/124; 382/278

(58) Field of Classification Search .......... 382/115, 382/117–118, 159, 181, 209, 217–218, 224, 382/124, 278, 280; 340/5.8, 5.81, 5.82, 5.83; 902/3, 5
See application file for complete search history.

(56) References Cited

U.S. PATENT DOCUMENTS

| | | | | |
|---|---|---|---|---|
| 5,291,560 | A * | 3/1994 | Daugman | 382/117 |
| 5,751,836 | A | 5/1998 | Wildes et al. | |
| 6,301,376 | B1 * | 10/2001 | Draganoff | 382/124 |
| 6,614,919 | B1 * | 9/2003 | Suzaki et al. | 382/117 |
| 7,197,166 | B2 * | 3/2007 | Jeng | 382/118 |
| 7,379,567 | B2 * | 5/2008 | Azuma et al. | 382/117 |
| 7,483,569 | B2 * | 1/2009 | Bhagavatula et al. | 382/181 |
| 2005/0175225 | A1 * | 8/2005 | Shinzaki | 382/124 |
| 2006/0222212 | A1 * | 10/2006 | Du et al. | 382/115 |
| 2007/0036397 | A1 * | 2/2007 | Hamza | 382/117 |

FOREIGN PATENT DOCUMENTS

EP 1237117 9/2002

OTHER PUBLICATIONS

Boles, et al. "A Human identification technique using images of the iris and wavelet transform", IEEE, pp. 1185-1188, 1998.*

J. Daugman, "The Importance of Being Random: Statistical Principles of Iris Recognition," Pattern Recognition, vol. 36 pp. 279-291, 2003.

R.P. Wildes, "Iris Recognition: An Emerging Biometric Technology," Proc. of the IEEE, vol. 85 pp. 1348-1363, 1997.

L. Ma, T. Tan, Y. Wang and D. Zhang, "Efficient Iris Recognition by Characterizing Key Local Variations," IEEE Trans. on Image Processing, vol. 13, pp. 739-750, 2004.

Kazuyuki Miyazawa, Koichi Ito, Takafumi Aoki, Koji Kobayashi and H. Nakajima, "An Efficient Iris Recognition Algorithm Using Phase-Based Image Matching," Proc. IEEE International Conference on Image Processing, Genoa, 2005.

Koichi Ito, Ayumi Morita, Takafumi Aoki, Tatsuo Higuchi, Hiroshi Nakajima and K. Kobayashi, "A Fingerprint Recognition Algorithm Using Phase-Based Image Matching for Low-Quality Fingerprints," Proc. IEEE International Conference on Image Processing, Genoa, 2005.

(Continued)

Primary Examiner—Daniel G Mariam
(74) Attorney, Agent, or Firm—Ungaretti & Harris LLP

(57) ABSTRACT

A method of comparing a test iris image with a candidate iris image comprises generating test and candidate lists representative of measured image values along respective curves around the pupils. Treating these list as periodic, a relative displacement is calculated at which one list best matches the other list. This determines the amount of rotation required for best match of the iris images. The method may be used either alone or in combination with other identity verification systems.

11 Claims, 3 Drawing Sheets

OTHER PUBLICATIONS

"International Preliminary Report on Patentability in PCT Application No. PCT/GB2007/000668 mailed Nov. 5, 2007", 11 pages.

Kumar, B V K et al., "Spatial frequency domain image processing for biometric recognition", *Proceedings 2002 International Conference on Image Processing. ICIP 2002.* Rochester, NY, Sep. 22-25, 2002, *International Conference on Image Processing*, New York, NY: IEEE, US., vol. 2 of 3, Sep. 22, 2002, pp. 53-56, XP010607258 ISBN: 0-7803-7622 Sep. 22, 2002.

Siewchin, Chong et al., "Iris Authentication Using Privatized Advanced Correlation Filter", *Advances in Biometrics. International Conference, Proceedings (Lecture Notes in Computer Science* vol. 3832), 2005, pp. 382-388, XP019026903.

Vijaya, Kumar B. et al., "Iris verification using correlation filters", *Audio- and Video-Based Biometric Person Authentication; 4th International Conference, AVBPA* 2003. *Proceedings* Jun. 9-11, 2003, Guildford, UK, pp. 697-705, XP002440485, (*Lecture Notes in Computer Science* vol. 2688).

Vijaya, Kumar B. et al., "Optimal Tradeoff Circular Harmonic Function Correlation Filter Methods Providing Controlled In-Plane Rotation Response", *IEEE Transactions on Image Processing, IEEE Service Center*, Piscataway, NJ, US, vol. 9, No. 6, Jun. 2000, XP011025606 ISSN: 1057-7149.

Zhang, D. D., "Automated Biometrics Passage", *Automated Biometrics: Technologies and Systems, Kluwer Academic Publishers*, Dordrecht, NL, 2000, pp. 170-175, XP002440484.

\* cited by examiner

ROTATION COMPENSATED IRIS COMPARISON

CROSS-REFERENCE TO RELATED APPLICATIONS

None.

FEDERALLY SPONSORED RESEARCH OR DEVELOPMENT

None.

TECHNICAL FIELD

The present invention relates to rotation compensated iris comparisons, and particularly although not exclusively to the matching of human irises, for example for identity verification. The method may be used alone or optionally to speed up or to improve the accuracy of other iris match or comparison algorithms.

BACKGROUND OF THE INVENTION

Personal authentication based on biometric verification is gaining increasing significance, with iris recognition in particular proving to be more accurate than other biometrics. Despite significant advances over the past decade, the need for robust iris recognition systems in the presence of variability in image size, position, and orientation still persists. Changes in position and size may be readily normalized in the pre-processing stage as they depend mainly on optical magnification and distance of the camera from the eye. It is also possible to compensate for non-affine pattern deformations and variations in pupil size by dilation within the iris. Iris orientation, on the other hand, depends upon a large number of internal and external factors including torsional eye rotation and head tilt. Optical systems may introduce image rotation depending on eye position, camera position, and mirror angles. Most present-day matching systems rotate the iris image by various amounts about the captured orientation to generate an array of feature vectors which are compared separately to find the best match.

One approach is discussed in J. Daugman, "*The importance of being random: Statistical principles of iris recognition,*" *Pattern Recognition*, vol. 36, pp. 279-291, 2003. Daugman computes the iris code in a single canonical orientation and compares it with several orientations by cyclic scrolling. The use of multiple comparisons leads to higher storage requirements and increased time to enrol and verify.

Correlation filters are known to offer good matching performance in the presence of image variability, and several researchers have investigated the use of correlation for biometric authentication; see for example R. P. Wildes, "*Iris recognition: an emerging biometric technology,*" *Proc. of the IEEE*, vol. 85, pp. 1348-1363, 1997. L. Ma, T. Tan, Y. Wang, and D. Zhang, "*Efficient iris recognition by characterizing key local variations,*" *IEEE Trans. on Image Processing*, vol. 13, pp. 739-750, 2004. Others have used phase based image matching to achieve good results in fingerprint and iris recognition; see for example Kazuyuki Miyazawa, Koichi Ito, Takafumi Aoki, Koji Kobayashi, and H. Nakajima, "*An Efficient Iris Recognition Algorithm Using Phase-Based Image Matching,*" *Proc, IEEE International Conference on Image Processing, Genoa*, 2005. and Koichi Ito, Ayumi Morita, Takafumi Aoki, Tatsuo Higuchi, Hiroshi Nakajima, and K. Kobayashi, "*A Fingerprint Recognition Algorithm Using Phase-Based Image Matching for Low-Quality Fingerprints,*" *Proc. IEEE International Conference on Image Processing, Genoa*, 2005.

In all such work the 2D cross-correlation techniques used require the storage of the entire database of images along with their iris codes. The operations described are computationally intensive, and typically affect the speed of the verification/identification process significantly.

SUMMARY OF THE INVENTION

The invention in its various aspects finds particular although not exclusive application in determining an angle of alignment at which a first iris image best fits a second iris image. The invention may optionally be used in conjunction with one or more separate algorithms to help in deciding whether the first image, suitably aligned, is from the same individual as the second image.

According to the present invention there is provided a method of comparing a test iris image with a candidate iris image, the method comprising:
(a) generating a test list and a candidate list representative of measured image values along respective curves around respective pupils; and,
(b) treating the lists as periodic, calculating a relative displacement at which one list best matches the other list, said displacement being representative of a relative rotation at which the test image best matches the iris image.

The invention further extends to any of the following methods, and to any compatible combinations of any two or more of these methods:

A method for rotational alignment of a plurality of images of the eyes of any species in which one or more lists of pixel values from one or more curves following the outline of the pupil are processed between pairs of iris images from which the amount of rotation required to bring the two iris images into best alignment can be determined.

A method in which the pupils are circular or nearly circular and the curves are circular.

A method in which a first step in processing comprises averaging the pixel values from corresponding positions over several curves to obtain a reduced number of curves.

A method in which all the curves are averaged to produce one list of averaged pixel values representative of the variation in pixel value around a curve following the outline of the pupil.

A method in which the iris is re-sampled into a rectangular array and in which a straight line through the re-sampled image corresponds to a curve following the outline of the pupil.

A method in which a first step in processing comprises averaging the pixel values from corresponding positions over lists to obtain a reduced number of curves.

A method in which all the curves are averaged to produce one list of average pixel values representative of the variation of pixel value around a curve following the outline of the pupil.

A method in which the amount of rotation between two irises is determined by direct comparison of their lists of pixel values.

A method in which a second step in processing comprises a computation on the lists of pixel values.

A method in which the computation comprises computing a cross correlation function between the lists of pixel values from two irises.

A method in which the cross correlation function is obtained by directly processing the lists of pixel values.

A method in which the cross correlation function is obtained by (i) calculating the fourier transforms of two lists of pixel values (ii) point by point multiplication of the two lists of fourier coefficients and (ii) calculating the inverse fourier transform of the multiplied list.

A method in which the cross correlation function is obtained by (i) calculating the fourier transforms of two lists of pixel values (ii) point by point multiplication of one list of fourier coefficients by the complex conjugates of the other list of fourier coefficients and (iii) calculating the inverse fourier transform of the multiplied list.

A method in which the position of the maximum value of the correlation function indicates the amount of rotation between two irises.

A method in which the correlation function is subjected to further processing to determine the amount of rotation between two irises.

A method in which the further processing is a filtering operation to reduce noise and identify a significant maximum in the correlation function.

A method in which the determination of the amount of rotation assists in the identification of an iris stored in an identity matching system.

A method in which a list of stored iris codes contains processed lists of pixel values for the determination of the amount of rotation required to align a non-stored iris with one or more stored irises.

A method in which one or more lists of pixel values are stored.

A method in which one or more lists of fourier coefficients determined from lists of pixel values are stored.

A method in which the results are used as a method of verifying the claimed identity of an individual.

A method in which the results are used as a method of rejecting the claimed identity of an individual.

A method in which the results are used to select one or more individuals from a database of iris data as having a matching iris.

A method in which the results used to reject an iris as having no match in a database of iris data.

A method in which the rejection is used to improve the speed of an identity matching system which would otherwise carry out further processing.

A method in which the rejection or selection is used in combination with other data to obtain improved accuracy of identification compared to the system without iris rotational matching.

BRIEF DESCRIPTION OF THE DRAWINGS

The invention may be carried into practice in a variety of ways and several specific embodiments will now be described, by way of example, with reference to the accompanying drawings, in which.

DETAILED DESCRIPTION OF THE PREFERRED EMBODIMENTS

Figure 1:
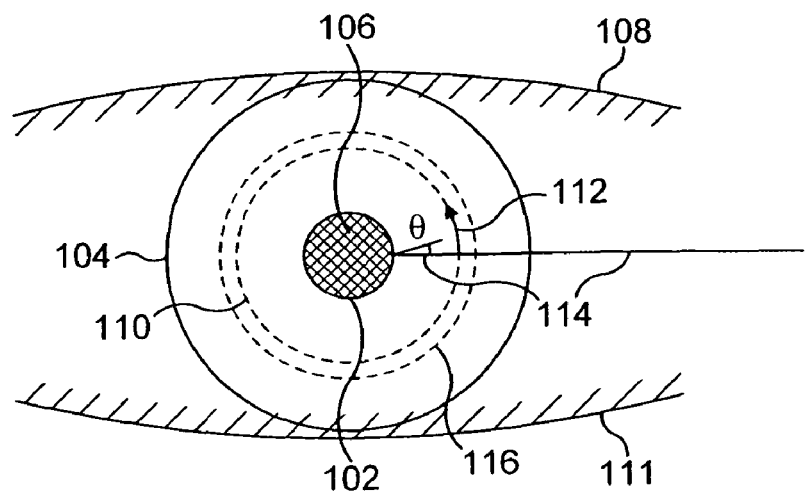
FIG. 1 illustrates the process of data collection on a human eye.

Prior to application of the preferred method of the present invention, an eye image, schematically shown in FIG. 1, will typically be pre-processed to eliminate unnecessary information. First, the inner 102 and outer 104 iris boundaries are located in order to eliminate the pupil 106, sclera (not shown) and upper and lower eyelids and eyelashes 108, 111. The resulting iris image if desired may be adjusted to allow for the effect of iris dilation and contraction, and grey scale and intensity adjustments may also be applied.

Figure 2:
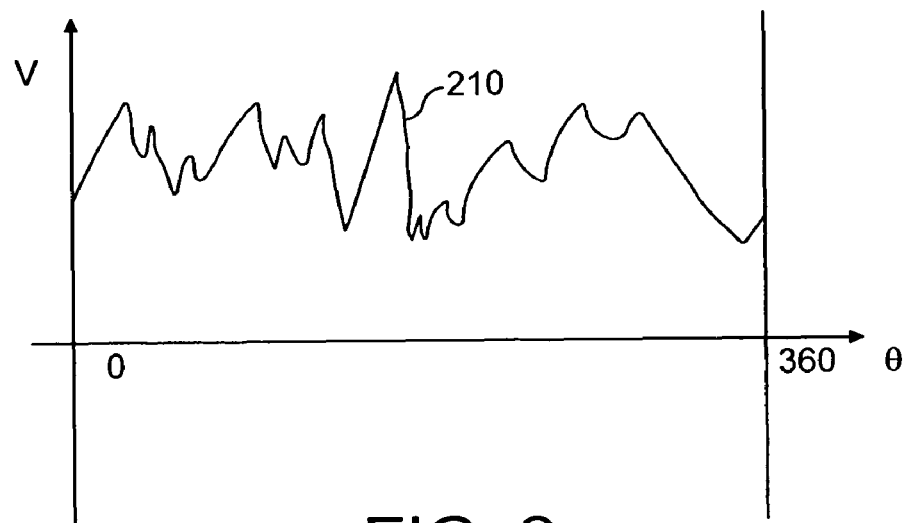
FIG. 2 illustrates the cyclic function/pixel value list generated as a result of the measurements.

The next step is to sample the pixel values around a closed curve 110, to generate a pixel value function or sampled list 210, as shown in FIG. 2. Although not essential, the curve 110 will typically take the form of a circle, centered on the middle of the pupil 106. The values may be sampled by travelling around the curve as shown by the arrow 112, for example by starting at a predefined zero direction 114, and stepping around the circle in increments of equal angle. The values will typically be based on sample intensities, although other characteristics such as colour could also be used.

The samples may be used as recorded, or the list may be pre-processed in some way, for example by interpolation or normalization, before use.

The size/location of the curve 110 within the iris image may be chosen according to the particular application. A curve 110 could, for example, be a fixed distance from the inner boundary 102 or from the outer boundary 104. Alternatively, the curve could be located at a fixed proportion of the distance between the inner and outer boundaries, for example exactly half way between them.

An alternative but essentially equivalent approach is to transform the iris image from polar coordinates into a rectangular image, and then to sample a straight or a curved line within the transformed image.

Instead of the function 210 representing the pixel values of a single curve 110, it may instead represent averaged values of two or more curves, for example the averaged values, in the same angular direction, of the curve 110 already mentioned and a second curve 116. An alternative option would be to use a single curve but, at each angular location, to take the average of the pixel values within a small region. Other methods of grouping/weighting/averaging curves will occur to the skilled person. The resultant trace 210 of FIG. 2 should show sufficient detail to be unique to the individual, while largely excluding details attributable to noise.

The aim is to determine whether the iris image of FIG. 1 (the "test image") matches or possibly matches a pre-existing candidate or stored image within an iris image database. Each of the stored images within the database has already been processed as discussed above, and each candidate image within the database will accordingly have its own representative trace 210.

Because the trace 210 represents a closed curve within the iris, it may conveniently be considered and mathematically analysed as a periodic one-dimensional function. This is a significant improvement on existing 2D approaches.

One simplistic approach would be to take the periodic test trace and slide it with respect to the periodic candidate trace, to find the position of best match. By comparing the goodness of fit at that point, one can then accept or reject a hypothesis that the test image matches the candidate image. The extent of the offset represents the angular rotation that one of the images has undergone to fit the other. Limits on the permitted amount of angular rotation may be imposed, to reduce processing requirements or to avoid specious matches at large angles which are unlikely to be correct. Typically, full 360° matching is not necessary in many applications since both the candidate and the test iris image will normally have been taken with the subject more or less upright. Minor angular variations may be introduced if the subject's head was held at a slight angle when the image was taken, or if the camera itself is not vertical and positioned directly in front of the subject. Such variations will frequently occur if initial image collection was carried out using a hand-held camera.

A more sophisticated approach (which will be preferred in most applications) is to calculate a cross-correlation function between the test trace and the candidate trace. The goodness of fit may then be determined based on the size of any peak within the cross-correlation output, with the position of that peak representing the rotational angle of best match. Once again, numerical limits on the extent of allowable rotation may be imposed, if necessary. This approach may in some circumstances provide a greater matching resolution than the sample resolution that was used to capture the data.

Figure 3:
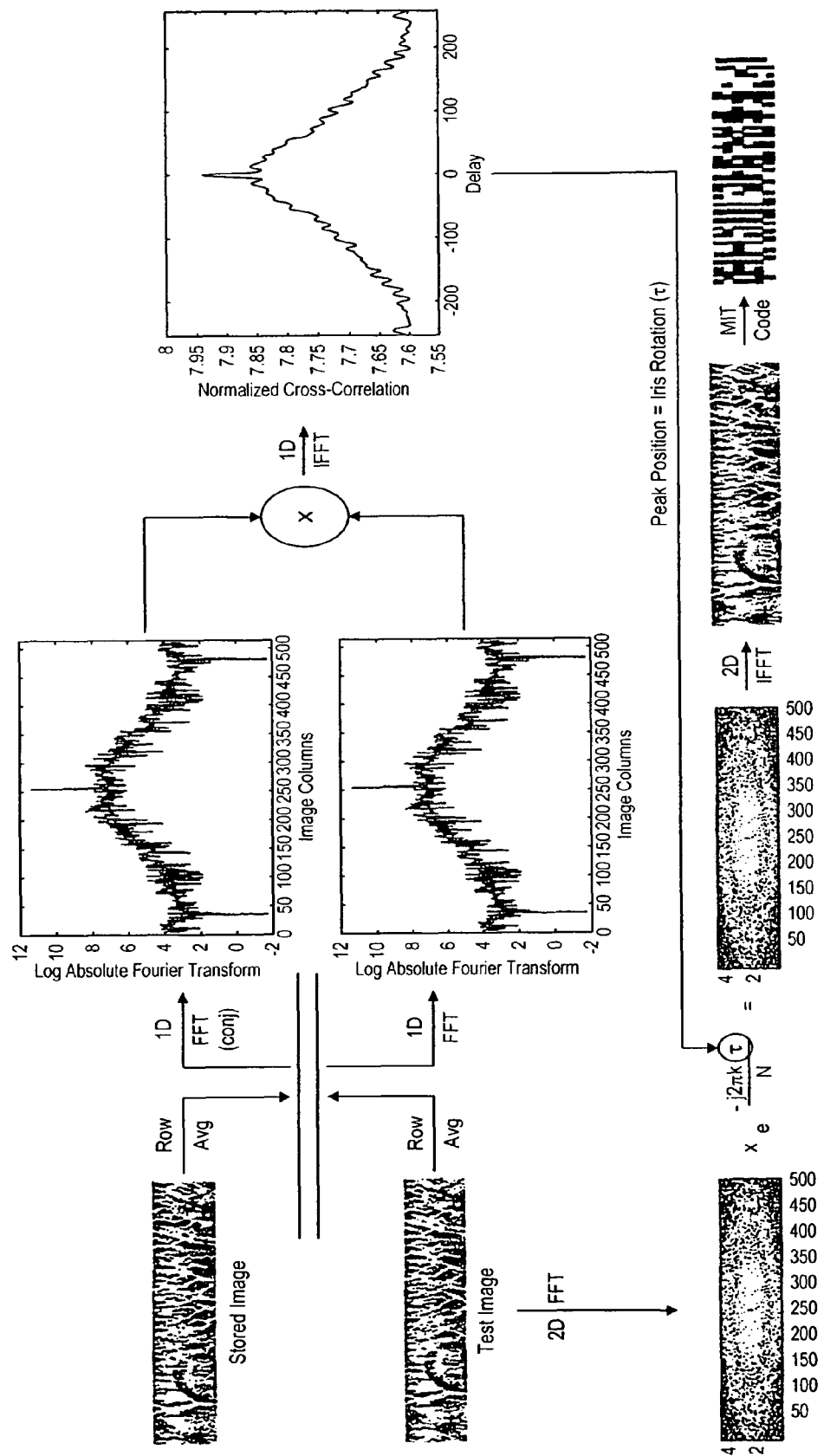
FIG. 3 shows a typical procedure for cross-correlation.

An even more advantageous approach, suitable for many applications, is illustrated in FIG. 3. Here, a fourier transform such an FFT is calculated both for the test trace and for the candidate trace. One of these FFTs is then multiplied by the conjugate of the other, and the inverse fourier transform of the product is then taken to obtain the final cross-correlation.

In FIG. 3, the initial FFT is taken on a row average of the respective stored and test images, after conversation from polar to Cartesian co-ordinates. It will be understood of course that that is not essential, and that any method of creating the one-dimensional trace 210, as described above, may be used instead.

As mentioned above, the circular symmetry about the circumferential direction in the iris image translates into horizontal periodicity of the output trace 210. In FIG. 3, this symmetry is exploited using the discrete fourier transform (DFT) properties of 1D circular cross-correlation. An overview of the basic properties follows.

Consider the N-point DFT of a finite sequence x(n) of length $L \leq N$. This is equivalent to the N-point DFT of a periodic sequence $x_p(n)$ of period N, obtained by periodically extending x(n) [12], that is, $$x_p(n) = \sum_{l=-\infty}^{\infty} x(n-lN)$$

By shifting $x_p(n)$ to the right by k samples we can obtain another periodic sequence, $$x'_p(n) = x_p(n-k) = \sum_{l=-\infty}^{\infty} x(n-k-lN)$$

Hence, we can see that the finite duration sequence, $$x'(n) = \begin{cases} x'_p(n) & 0 \leq n \leq N-1 \\ 0 & \text{otherwise} \end{cases}$$

is related to the original sequence x(n) by a circular shift. In general, the circular shift of the sequence can be represented as the index modulo N. Thus we can write, $$x'(n) = x((n-k))_N$$

From fourier transform properties, we know that circular convolution in the space domain is equivalent to multiplication in the fourier domain. Similarly, a space domain circular time shift is equivalent to frequency domain multiplication by an exponential, $$x_1(n) \otimes x_2(n) \Leftrightarrow X_1(n)X_2(n)$$

$$x((n-l))_N \Leftrightarrow X(k)e^{-\frac{j2\pi kl}{N}}$$

Finally, the unnormalized circular cross-correlation $\tilde{r}_{xy}(l)$ at delay l between two sequences x(n) and y(n) is calculated from their fourier transforms X(k) and Y(k) as follows:

$$\tilde{r}_{xy}(l) = \sum_{n=0}^{N-1} x(n)y^*((n-l))_N$$

$$\tilde{r}_{xy}(l) \Leftrightarrow \tilde{R}_{xy}(k) = X(k)Y^*(k)$$

In the specific application of FIG. 3, for each test iris, a periodic sequence is extracted from a 512×80 normalized iris image by averaging rows 5-9 of the image, counted from the pupil boundary. This avoids outer regions which may be obscured by eyelashes or eyelids, and is far enough from the pupil boundary to avoid irregularities. The conjugate of the 1D FFT of this is then stored along with its feature vector. A candidate image is normalized and the FFT of the same band is calculated for use in rotation compensation with the test iris FFT.

After calculation of the cross-correlation, the peak sharpness is measured using methods described below, and its location is noted. For similar irises a sharp peak is expected, while a flatter curve corresponds to a non-match. The degree of iris-rotation is indicated by the position of the peak. If the peak is sufficiently sharp, the normalized image from the candidate iris is shifted into alignment with the registered iris and an iris code is finally calculated for more detailed matching (e.g., using some other more processor-intensive algorithm).

Figure 4:
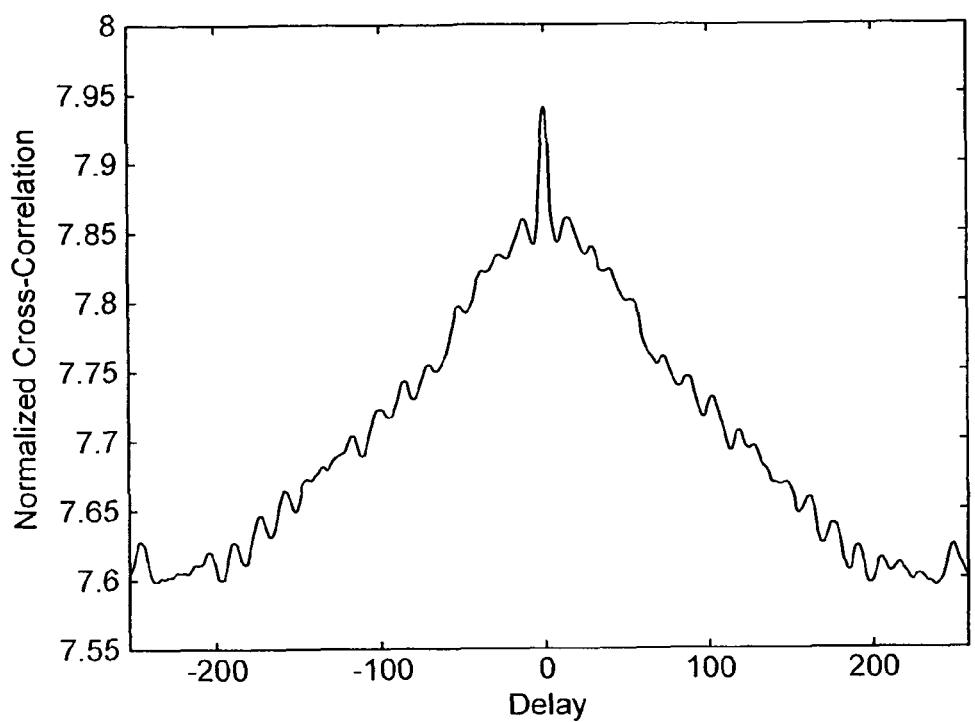
FIG. 4 shows a normalised cross-correlation trace based on matching iris images; and, FIG. 5 shows a normalised cross-correlation trace between nearest non-matching iris images.
Figure 5:
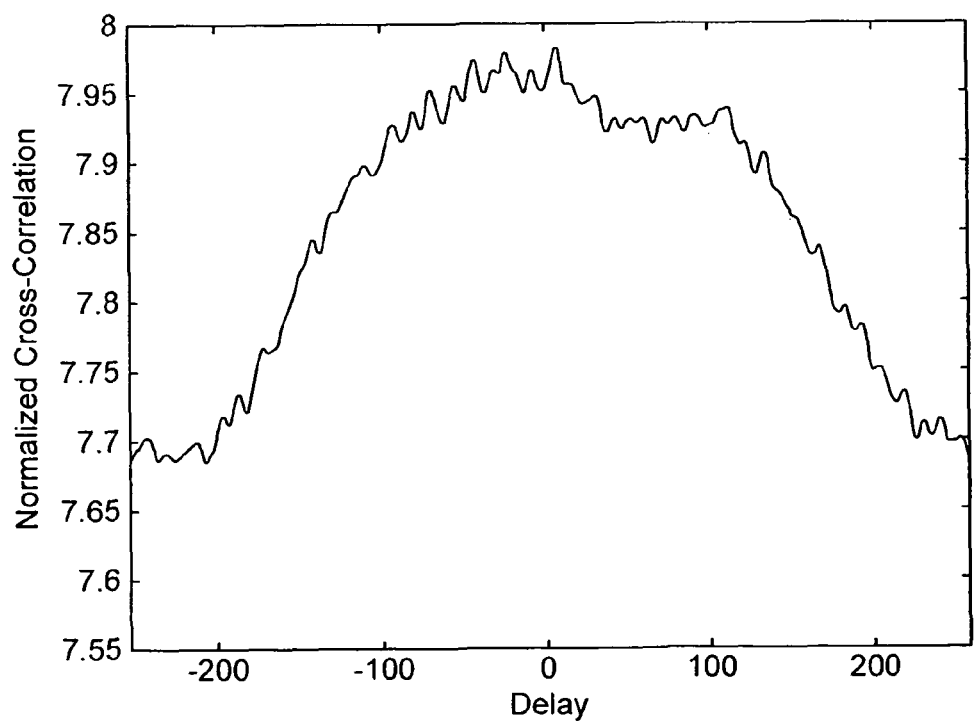

Since the initial match is based on the correlation peak, it is necessary to have a quality-of-match metric for independent discrimination. To make such a decision robust to image variability, it should preferably be based on a larger region of the correlation output. From observations of various correlation plots such as the ones shown in FIG. 4, it can be concluded that a good metric is based on the variance in a restricted region about the peak.

Good discrimination was obtained using a Peak-to-Sidelobe Ratio (PSR). For this, the sidelobe value S is taken as the mean of a 332 value region centred on the peak, i.e., 166 correlation values either side of the peak, excluding 13 values centered on the peak. If the peak is P and the standard deviation of the sidelobe values is σ, the PSR is $$PSR = \frac{P-S}{\sigma}$$

The narrow peak and wide sidelobe exploit the global dominance of the matching peak while not allowing local maxima of non-matches to bias the discrimination.

The methods described above may be applied both to identity verification, and to identification. In identity verification, the system attempts to verify an asserted identity, and accordingly a single comparison is made between a test image and a known image of the person whose identity is being asserted. For identification, the task is to check all possible candidates in iris database, to find all possible matches. In the latter case, the system may, for example, be attempting to find out how many times a person has registered under an assumed name within the database.

The described method may either be used alone, as a method of iris matching, or it may alternatively be used in conjunction with some other biometric matching system to improve speed and/or accuracy. In the latter case, an embodiment of the invention may be used to find the best matching angle between a test and a candidate iris, leaving some other biometric system or algorithm to determine whether the two irises are in fact the same.

A further possibility is to use an embodiment of the present invention to carry out pre-selection. In the PSR embodiment described above, pre-selection may be achieved by discarding PSRs lower than an experimentally set threshold of 1.5, followed by removal of cases having rotation indices greater than 20 pixels on either side. Images passing the pre-selection test were rotated into alignment before being encoded with a two dimensional code as shown towards the bottom of FIG. 3. Feature vectors for the selected rotated images were then generated and compared within the stored images to give the waited Hamming distance, which can be used in matching/verification.

For applications in which storage space is limited, it may be noted that it is not necessary to store all of the original iris information. The database being queried could, in suitable applications, store only the pre-calculated FFTs.

What is claimed is:

1. A method of aligning a test iris image with a candidate iris image, comprising the steps of:
    (a) generating a one-dimensional test list and a one-dimensional candidate list representative of measured image values along respective closed curves around respective pupils;
    (b) calculating a cross-correlation between the test list and the candidate list including the step of calculating respective digital fourier transforms of the lists, multiplying the respective transforms or a conjugate thereof, and calculating an inverse digital fourier transform to generate the cross-correlation;
    (c) determining from said cross-correlation a relative displacement at which the test list best matches the candidate list, said displacement being representative of a relative rotation at which the test iris image is best aligned with the candidate iris image; and utilizing said displacement in a biometric matching system.

2. A method as claimed in claim 1 further including the step of sliding the test list with respect to the candidate list.

3. A method as claimed in claim 1 further including the step of pre-calculating and storing digital fourier transforms for a plurality of candidate iris images.

4. A method as claimed in claim 1 in which the test and candidate lists are representative of averaged image characteristics over a local region which follows the curves.

5. A method as claimed in claim 1 in which the test and candidate lists represent averaged image values over a plurality of respective curves.

6. A method as claimed in claim 1 in which the test and candidate lists are generated by measuring image values from respective lines within re-mapped rectangular images of the respective irises.

7. A method as claimed in claim 1 further including the step of assessing a quality of match at the said displacement.

8. A method as claimed in claim 7 further including the step of determining whether the test and candidate images do or do not belong to the same individual according to the quality of match.

9. A method as claimed in claim 7 further including the step of using the quality of match as well as additional biometric data to determine whether the test and candidate images do or do not belong to the same individual.

10. A method as claimed in claim 7 further including the steps of comparing the test image with a plurality of candidate images, and determining one or more matches according to the respective qualities of match.

11. A method as claimed in claim 7 further including the steps of comparing the test image with a plurality of candidate images, determining one or more potential matches according to the respective qualities of match, and passing the potential matches to an identity matching system to determine which, if any, of the potential matches can be accepted.

* * * * *